United States Patent
Tramoni et al.

(10) Patent No.: US 12,346,757 B2
(45) Date of Patent: Jul. 1, 2025

(54) ELECTRONIC DEVICE POWERING

(71) Applicants: STMICROELECTRONICS (ROUSSET) SAS, Rousset (FR); STMICROELECTRONICS (ALPS) SAS, Grenoble (FR)

(72) Inventors: Alexandre Tramoni, Le Beausset (FR); Patrick Arnould, Voreppe (FR)

(73) Assignees: STMICROELECTRONICS (ROUSSET) SAS, Rousset (FR); STMICROELECTRONICS (ALPS) SAS, Grenoble (FR)

( * ) Notice: Subject to any disclaimer, the term of this patent is extended or adjusted under 35 U.S.C. 154(b) by 402 days.

(21) Appl. No.: 17/884,238

(22) Filed: Aug. 9, 2022

(65) Prior Publication Data

US 2023/0055356 A1 Feb. 23, 2023

(30) Foreign Application Priority Data

Aug. 17, 2021 (FR) ...................................... 2108720

(51) Int. Cl.
*G06K 19/07* (2006.01)

(52) U.S. Cl.
CPC ..... *G06K 19/0702* (2013.01); *G06K 19/0723* (2013.01)

(58) Field of Classification Search
CPC .................. G06K 19/0702; G06K 19/190723
See application file for complete search history.

(56) References Cited

U.S. PATENT DOCUMENTS

| | | |
|---|---|---|
| 9,178,572 B1 | 11/2015 | Zhang |
| 11,099,619 B2 | 8/2021 | Boitard et al. |
| 2004/0077383 A1 | 4/2004 | Lappetelainen et al. |
| 2009/0088077 A1 | 4/2009 | Brown et al. |
| 2012/0260119 A1 | 10/2012 | Garnier et al. |
| 2013/0332756 A1 | 12/2013 | Kim et al. |
| 2014/0154979 A1 | 6/2014 | Tomas et al. |
| 2015/0118965 A1 | 4/2015 | Butler |
| 2015/0154486 A1 | 6/2015 | McFarthing et al. |
| 2015/0287031 A1 | 10/2015 | Radu et al. |
| 2015/0339659 A1 | 11/2015 | Ballesteros |
| 2017/0142159 A1 | 5/2017 | Li et al. |
| 2019/0156994 A1 | 5/2019 | Cox |

(Continued)

FOREIGN PATENT DOCUMENTS

| CN | 205945737 U | 2/2017 |
|---|---|---|
| CN | 207994925 U | 10/2018 |

(Continued)

*Primary Examiner* — Rafael O De Leon Domenech
(74) *Attorney, Agent, or Firm* — Seed IP Law Group LLP

(57) ABSTRACT

The present disclosure relates to an electronic device comprising: at least one universal integrated circuit card or at least one secure element and at least one power supply circuit for said card or secure element, said power supply circuit being connected to at least a first power supply voltage source of the electronic device and comprising a voltage detector adapted to determine whether said first voltage source provides a first power supply voltage different from a reference voltage; and at least one near field communication module adapted to enter an active mode whenever said voltage detector determines that said first supply voltage is different from the reference voltage.

20 Claims, 3 Drawing Sheets

(56) References Cited

U.S. PATENT DOCUMENTS

| | | | |
|---|---|---|---|
| 2019/0305599 A1* | 10/2019 | Kim | H04B 5/00 |
| 2020/0169300 A1 | 5/2020 | Moon et al. | |
| 2021/0135490 A1 | 5/2021 | Revelant et al. | |
| 2023/0058758 A1 | 2/2023 | Tramoni et al. | |

FOREIGN PATENT DOCUMENTS

| | | |
|---|---|---|
| CN | 210958815 U | 7/2020 |
| EP | 2521072 A1 | 11/2012 |
| WO | WO 2016081013 A1 | 5/2016 |

\* cited by examiner

ELECTRONIC DEVICE POWERING

CROSS-REFERENCE TO RELATED APPLICATION(S)

This application claims the priority benefit of French patent application number FR2108720, filed on Aug. 17, 2021, entitled "Alimentation d'un dispositif électronique", which is hereby incorporated by reference to the maximum extent allowable by law.

BACKGROUND

Technical Field

The present disclosure relates to electronic systems and devices generally, and to powering such systems and devices. More particularly, the present disclosure relates to electronic devices adapted for near field communication (NFC), and to adapting the powering means for such electronic devices.

Description of the Related Art

Wireless communications are increasingly used nowadays for various applications such as information exchanges, bank payments, energy exchanges, etc. There are several wireless communication types such as near field communication (NFC), communications using high frequencies at longer distances, such as Bluetooth communications, and so on.

It would be desirable to be able to improve certain aspects of known devices adapted to near field communication technology, at least in part.

BRIEF SUMMARY

There is a need for devices adapted to near field communication technology with improved performance.

There is a need for devices adapted to near field communication technology with less power consumption.

There is a need for devices adapted to near field communication technology that start faster.

One embodiment addresses all or some of the drawbacks of known devices adapted to near field communication technology.

One embodiment provides an electronic device comprising:

at least one universal integrated circuit card or at least one secure element and at least one power supply circuit for said card or secure element, said power supply circuit being connected to at least a first power supply voltage source of the electronic device and comprising a voltage detector adapted to determine whether said first voltage source provides a first power supply voltage different from a reference voltage; and at least one near field communication module adapted to enter an active mode whenever said voltage detector determines that said first supply voltage is different from the reference voltage.

Another embodiment of a method for powering an universal integrated circuit card or secure element comprised in an electronic device further comprising:

at least one power supply circuit for said card or secure element, said power supply circuit being connected to at least a first power supply voltage source of the electronic device and comprising a voltage detector adapted to determine whether said first voltage source provides a first power supply voltage different from a reference voltage; and at least one near field communication module adapted to enter an active mode whenever said voltage detector determines that said first supply voltage is different from a reference voltage.

According to one embodiment, in the power supply circuit of said secure card or element, the first supply voltage of said first voltage source is supplied to said secure card or element through a switch controlled by a first circuit comprising a voltage follower and a first slew rate limiter.

According to one embodiment, whenever said voltage detector determines that said first supply voltage is different from the reference voltage, said near field communication module controls the startup of said first circuit.

According to one embodiment, whenever said voltage detector determines that said first supply voltage is equal to the reference voltage, said near field communication module controls the shutdown of said first circuit.

According to one embodiment, said power supply circuit is connected to at least one second power supply voltage source of the electronic device.

According to one embodiment, said at least one second power supply voltage source is a battery.

According to one embodiment, the power supply circuit of said secure card or element, a second supply voltage from said second voltage source is supplied to said secure card or element through a second circuit comprising a linear voltage regulator and a second slew rate limiter.

According to one embodiment, whenever said voltage detector determines that said first power supply voltage is different from the reference voltage, said near field communication module disables the automatic startup of said second circuit.

According to an embodiment, whenever said voltage detector determines that said first supply voltage is equal to the reference voltage, said near field communication module enables automatic startup of said second circuit.

According to one embodiment, when the near field communication module goes from a standby state or an inactive state to an active state, the following successive operations are performed:

the components and circuits of said electronic device are started;

the software of the electronic device and said card are started at the same moment.

According to one embodiment, the startup of said secure card or element comprises the following successive steps:

starting the power circuit of said card or said secure element; and starting the software of said card or secure element.

According to one embodiment, during the startup of the power supply circuit said voltage detector checks whether the first voltage source provides a first supply voltage equal to the reference voltage.

According to one embodiment, the power supply circuit supplies said card or secure element with said second power source.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, the operations and elements that are useful for an understanding of the embodiments described herein have been illustrated and described in detail. In particular, the protocols used during the implementation of near field communication are not detailed. The embodiments described below are adapted to the usual protocols used when implementing near field communication.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, as orientated during normal use.

Unless specified otherwise, the expressions "around", "approximately", "substantially" and "in the order of" signify within 10%, and preferably within 5%.

Figure 1:
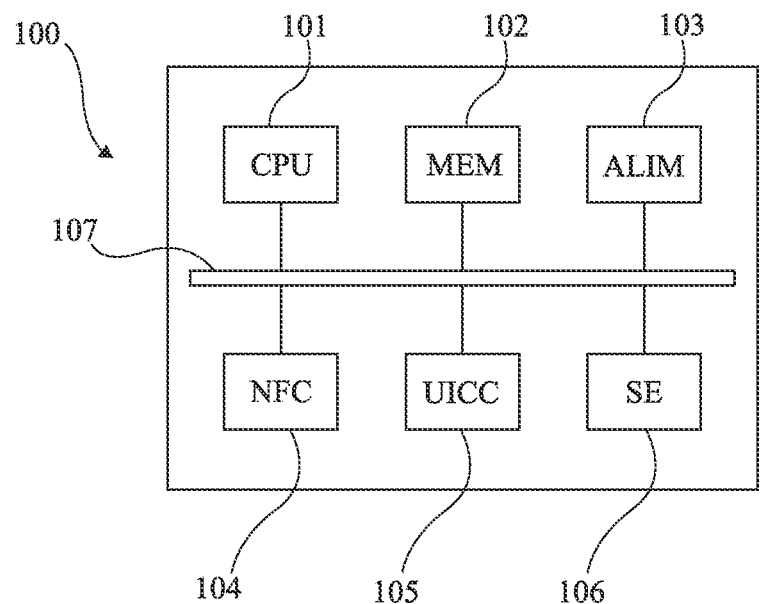
FIG. 1 shows one embodiment of an electronic device very schematically and in block form.

FIG. 1 shows one embodiment of an electronic device 100 very schematically and in block form.

The electronic device 100 comprises a processor 101 (CPU) adapted to implement different processing of data stored in memories and/or provided by other circuits of the device 100.

The electronic device 100 further comprises different types of memories 102 (MEM), including, for example, at least one volatile memory and at least one register, typically multiple registers. According to one example, the device 100 may further comprise a non-volatile memory, and a read-only memory. Each memory is adapted to store different data types.

The electronic device 100 further comprises power supply circuits 103 (ALIM). The circuits 103 manage the power supply to the various circuits and components of the device 100. The circuits 103 comprise at least one battery, one means for recharging the battery, voltage matching circuits such as voltage regulators, for example, and so on. One embodiment of one of the power supply circuits 103 is described in more detail in connection with FIGS. 3 through 5.

The electronic device 100 further comprises (NFC) circuits 104 adapted to implement a near field communication, or near field communication module 104, or NFC module 104. The NFC module 104 comprises oscillating/resonant circuits, data transmitting and receiving circuits, data converting circuits, for example, and so on. One example of near field communication and the various functionalities of the NFC module 104 are described in more detail in connection with FIG. 2.

The electronic device 100 is further adapted to comprise at least one universal integrated circuit card (UICC) 105, also known as a subscriber identification module (SIM) card, and possibly more than one. A universal integrated circuit card 105 is a card comprising confidential data related to one or more functions of the electronic device 100. According to a common example, a SIM card type of circuit card 105 may be used in a cellular phone to enable the use of telephone communications. According to another example, a circuit card 105 may enable implementation of banking applications or of public transportation applications by an electronic device. The card or boards 105 may be secure elements, in some cases.

The electronic device 100 further comprises at least one secure element 106 (SE) adapted to implement various functions of the device 100 in a secure manner. The secure element 106 may comprise a secure processor, memories for storing sensitive data, encryption and/or decryption circuits, circuits for securely communicating with other electronic devices, and so on. According to one embodiment, a portion of the NFC module 104 is part of the secure element 106.

The electronic device 100 may further comprise circuits not shown in FIG. 1, adapted to implement different functions of the device 100. The circuits are diverse and may comprise measurement circuits, data analysis circuits, sensors, other circuits for communicating with other electronic devices, display devices, and so on.

The various circuits and modules of the device 100 are interconnected and may communicate via a communication bus 107.

As previously mentioned, the circuits 103 are adapted to manage the power supply voltage and current of the various circuits and components of the device 100. According to one embodiment, the circuits 103 comprise at least one circuit adapted in particular to manage the power supply of the cards 105 or the power supply of the secured element 106 by taking into account various power supply modes of the various circuits and components of the device 100. Such a circuit is described in more detail in connection with FIGS. 3 and 4. More particularly, in the embodiment described herein, the power supply to the cards 105 or to the secure element 106 depends on the operating mode of the NFC module 104. The various operating modes of the NFC module 104 are described in connection with FIG. 2.

Figure 2:
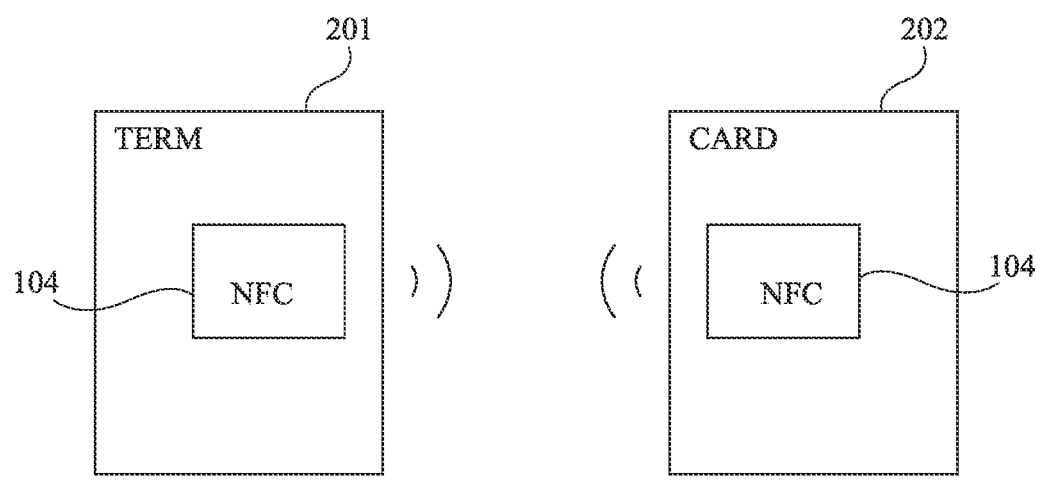
FIG. 2 shows one example of near field communication very schematically and in block form.

FIG. 2 shows a wireless communication schematically, and more particularly, a near field communication between electronic the devices 201 (TERM) and 202 (CARD). The device 202 is a device of the type of device 100 described in connection with FIG. 1. According to one example, the device 201 is also a device of the type of device 100 described in connection with FIG. 1.

Near field communication (NFC) technologies enable high frequency, short range communications. Such systems exploit a radio frequency electromagnetic field emitted by a device (terminal or reader) to communicate with another device (transponder or card).

In recent systems, the same device can operate in card mode or in reader mode (such as in the case of near field communication between two cell phones). It is then common for devices to be battery powered and their functions and circuitry to be put on standby so as not to consume power between periods of use. The devices are then "woken up" when they are within range of each other.

The case of two electronic devices 201 and 202 in which the device 201 is a terminal or reader and the device 202 is a transponder, for example, is assumed, but everything described applies more generally to any system in which a transponder senses an electromagnetic field radiated by a reader, point or terminal.

For communication, one of the devices operates in a so-called reader mode while the other operates in a so-called card mode or the two devices communicate in a peer-to-peer (P2P) mode, depending on the applications. Each device includes at least one electronic circuit 104 (NFC) or NFC module 104, for generating a radio frequency signal transmitted by means of an antenna of an oscillating/resonant circuit. The radio frequency field generated by one device 201 or 202 is captured by the other device 202 or 201 that is within range and also includes an antenna. In some applications, when a device is not communicating, it switches to standby mode, to reduce power consumption. This is particularly the case for battery-powered devices. When the first device 201 emits an electromagnetic field to initiate communication with the second device 202, this field is picked up by this second device 202 as soon as it is within range. This field is detected by the circuits 104 of the second device 202, which, if in standby, is reactivated. This results in a variation of the load formed by the circuits of the second device 202 on the resonant field-generating circuit of the first device 201. In practice, the corresponding variation in phase or amplitude of the emitted field is detected by the first device 201, which then initiates an NFC communication protocol with the second device 202. On the first device 201 side, in practice, it is detected if the voltage amplitude across the resonant circuit falls below a threshold or if the voltage across the resonant circuit has a phase shift above a threshold. Once the first device 201 detects the presence of the second device 202 in its field, it initiates a procedure to establish communication, implementing request emissions by the first device 201 and responses by the second device 202.

During near field communication, the devices 201 and 202 are positioned within range of each other. Specifically, the device 202 is positioned within range of the device 201 so that it can sense the electromagnetic field of the device 201. As an example, the device 202 is positioned at a distance generally less than 10 cm from the device 201. According to another example, the device 202 is in mechanical contact with the device 201.

The device 201 is a terminal that may be fixed or mobile, for example. It is the device 201 that is in charge of initiating the communication. As an example, the terminal 201 is a payment terminal or a cell phone.

The device 202 is a generally mobile transponder. According to one preferred embodiment, the transponder 202 is a microcircuit card (or smart card) such as a bank card or a transport card. In a variant, the device 202 could be a cell phone or a connected object. According to one preferred embodiment, the device 202 comprises a universal integrated circuit card adapted to implement bank or transport card functionalities and/or a secure element. The various electronic circuits of the device 202 adapted to implement various commands sent by the device 201, such as authentication circuits, cryptography circuits, the cards 105, the secure element 106, etc., for example, are used upon receipt of the data transmitted by the transponder 201.

Furthermore, the different powering modes of certain circuits and components of the device 202 may influence the powering modes, or powering, of other circuits and components of the device 202. In particular and according to one embodiment, the NFC module 104 has multiple powering modes that affect the powering modes and powering of circuits and components of the device 202 and, in particular, the cards 105 or a secure element 106 of the device 202.

The NFC module 104 comprises at least three power modes: an active power mode, a standby power mode, and an inactive power mode. When the NFC module 104 is in the active power mode, i.e., the NFC module 104 is in an active state or is active, the NFC module 104 is available for use at any time. For example, the NFC module 104 is ready to perform near field communication. Most or all the circuits and components included in the NFC 104 module are powered and the NFC 104 module is likely to consume the most power in this mode. When the NFC module 104 is in the standby power mode, i.e., the NFC module is in a standby state or in sleep mode, the NFC module 104 is expected to be able to provide a service involving less functionality and thus just a part of the circuitry comprised in the NFC module 104 is powered. In this mode, the NFC module 104 generally consumes less power than in the active power mode. When the NFC module 104 is in the inactive or hibernation mode, i.e., when the NFC module 104 is in an inactive state or is inactive, a minimal portion of the circuitry in the NFC module 104 is powered. The NFC module 104 consumes the least amount of power in this mode.

Figure 3:
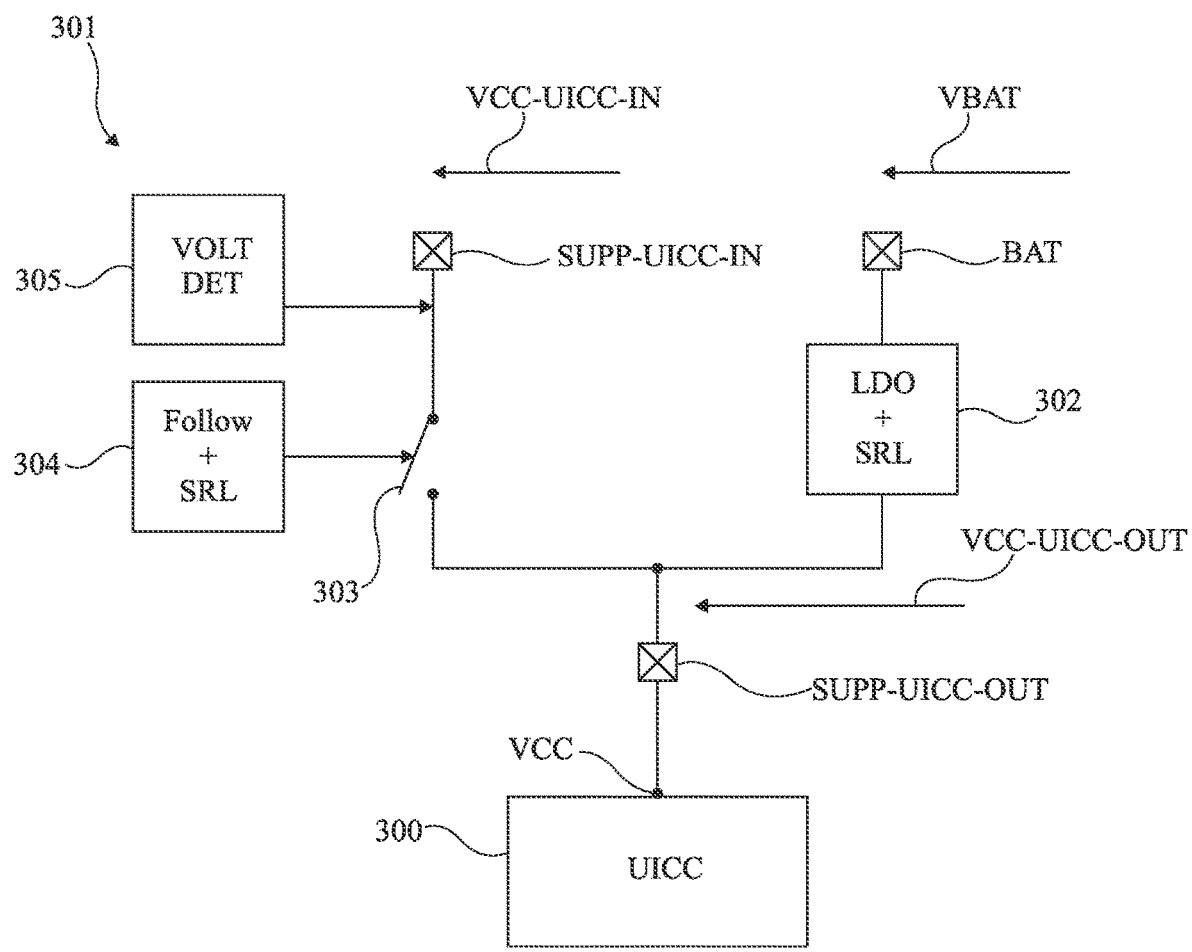
FIG. 3 shows one embodiment of a part of a power supply circuit of a part of the electronic device of FIG. 1, schematically and in block form.

FIG. 3 shows a universal integrated circuit card 300 and its power supply circuit 301 of an electronic device of the type of device 100 described in connection with FIG. 1, schematically and in block form. More particularly, the card 300 is a card 105 of the device 100 of FIG. 1 and the power supply circuit 301 is adapted to be part of the power supply circuits 103 of the device 100.

The circuit 301 comprises two input terminals, BAT and SUPP-UICC-IN, and an output terminal, SUPP-UICC-OUT. The two input terminals BAT and SUPP-UICC-IN are linked, preferably connected to power sources, and the output terminal SUPP-UICC-OUT is linked, preferably connected to a VCC power terminal of the card 300.

The input terminal BAT receives a supply voltage VBAT, referenced in relation to a reference voltage such as ground, from a battery. The supply voltage VBAT is a DC voltage, for example. According to one example, the battery is part of the power supply circuits of the electronic device of which the card 300 and the power supply circuit 301 are part. The input terminal BAT is connected to the output node SUPP-UICC-OUT via a circuit 302 (LDO+SRL) comprising:

- a linear voltage regulator (low-dropout regulator, LDO) adapted to adjust the value of the voltage VBAT to match the supply voltage value VCC-UICC-OUT expected by the card 300;
- a pull-down resistor, adapted to protect the low-dropout regulator during its starting; and
- a first slew rate limiter, adapted to protect the VCC supply terminal of the card 300 from current peaks.

The input terminal SUPP-UICC-IN receives a supply voltage VCC-UICC-IN, referenced in relation to the reference voltage, from another power source other than the battery. This power source is a main power source of the device in which the card 300 and the power supply circuit 301 are included, for example, which is turned on when said device is powered on and is turned off when said device is powered off. According to one example, the supply voltage from this power source is transmitted to the power terminal SUPP-UICC-IN via a data transmission line via a modulator/demodulator, or modem, for example. The input terminal SPP-UICC-IN is connected to the output node SUPP-UICC-OUT via a switch 303 controlled by a circuit 304 (Follow+SLR) comprising:

a voltage follower, adapted to match the impedance of the power source from which the voltage VCC-UICC-IN originates to the input impedance of the card 300; and a second slew rate limiter, adapted to protect the VCC power terminal of the card 300 from current peaks.

In addition and according to one embodiment, the voltage VCC-UICC-IN of the input terminal SUPP-UICC-IN is monitored by a voltage detector 305 (VOLT DET).

The operation of the power supply circuit 301 is as follows. A more detailed embodiment of the power supply circuit 301 is described in connection with FIG. 4.

The card 300 may be supplied with power from two different power sources, called the main power source and the battery, with the input terminal SUPP-UICC-IN receiving a supply voltage from the main power source and the input terminal BAT receiving a supply voltage from the battery, as described above. The battery is the default power mode for the card 300, and the main power source powers the card 300 when it is turned on. In addition, the power supply to the card 300 is controlled by the NFC module of the device comprising the card 300, and more specifically by the power mode of that NFC module. This aspect is described in more detail in connection with FIG. 4.

In particular, when the main power source is turned off, such as when the electronic device comprising the card 300 and the circuit 301 is turned off, the circuit 304 controls the opening of the switch 303, and the output node SUPP-UICC-OUT receives a supply voltage from the BAT terminal, through the circuit 302. In this case, the voltage VCC-UICC-IN has a value of the order of the reference voltage value.

In contrast, when the main power source is turned on, such as when said device is turned on or the data transmission line transmitting the supply voltage of said main power source is turned on, the circuit 304 controls the closing of the switch 303 to supply the voltage VCC-UICC-IN to the output terminal SUPP-UICC-OUT. In this case, the voltage VCC-UICC-IN has a value different from the reference voltage and adapted to supply the card 300. On the input terminal BAT side, the circuit 302 is not activated, to avoid having two power sources supplying the card 300 at the same time, and more particularly the voltage regulator of the circuit 302 is not activated.

According to one variant, the embodiment of FIG. 3 could be applied to powering the secure element of an electronic device of the type of the device 100 described in connection with FIG. 1. More particularly, in this case, the card 300 is replaced by a secure element 106 of the device 100 of FIG. 1, and the power supply circuit receives the voltage VCC-UICC-IN from a main power source of the electronic device or from a secondary power source dedicated primarily to powering the secure element. The description in FIG. 4 also applies to this variant.

Figure 4:
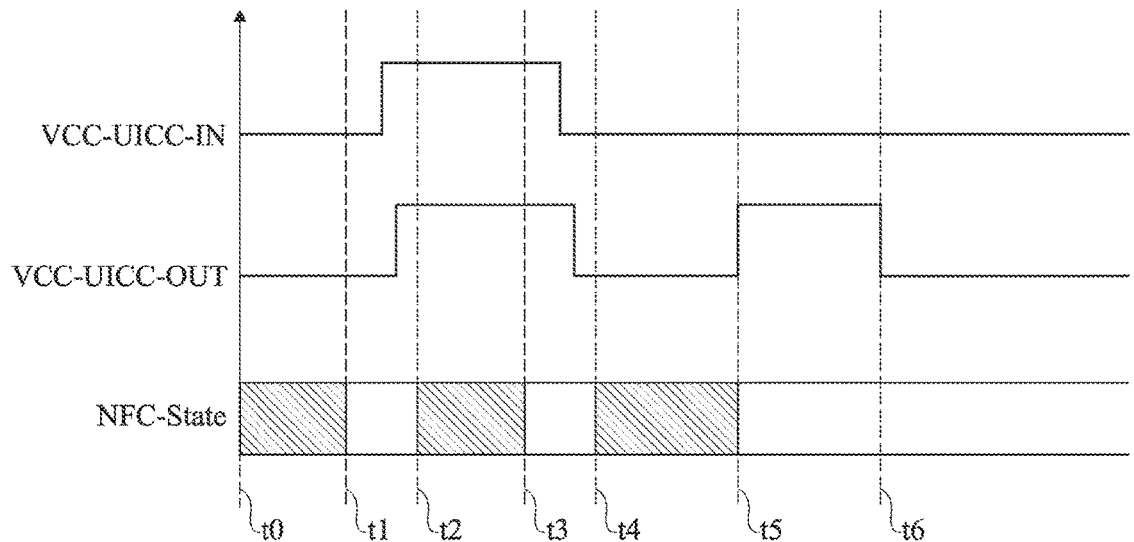
FIG. 4 shows timing diagrams illustrating the operation of the embodiment of FIG. 3.

FIG. 4 shows three timing diagrams illustrating the operation of the circuit 301 described in connection with FIG. 3. Specifically, FIG. 4 illustrates timing diagrams of:

the voltage VCC-UICC-IN received as input by the input terminal SUPP-UICC-IN;

the voltage VCC-UICC-OUT provided by the output terminal SUPP-UICC-OUT; and the states of the NFC module of the device comprising the card 300 and its power supply circuit 301.

Between an initial state t0 and an instant t1 subsequent to instant t0, the NFC module is in a state where it does not consume much power, such as in standby or an inactive state (hatched in FIG. 4). The main power source does not provide any supply voltage and the supply voltage VCC-UICC-IN is at a low level, i.e., at a voltage value of the order of the reference voltage. In addition, the NFC module controls the power supply to the card 300, and when the NFC module is in a standby or inactive state, the card 300 is not powered. Thus, the battery is not used to power the card 300, and the voltage VCC-UICC-OUT has a value of the order of the reference voltage.

Between the instant t1 and an instant t2 subsequent to instant t1, the voltage VCC-UICC-IN changes from a low state to a high state, i.e., to a state where the value of the voltage VCC-UICC-IN is adapted to power the card 300. According to one example, the device comprising the card 300 and the power supply circuit 301 is turned on, or the data transmission line providing the voltage VCC-UICC-IN is turned on. According to one embodiment, the voltage detector 305 detects this change in state of the voltage VCC-UICC-IN (e.g., detects VCC-UICC-IN is different from a reference voltage) and informs the NFC module, which then enters an active state or mode. Upon entering an active state, the NFC module controls the starting of the circuit 304, and more specifically the starting of the voltage follower and the slew rate limiter comprised in the circuit 304. For example, upon being started, the voltage follower matches the impedance of the power source from which the voltage VCC-UICC-IN originates to the input impedance of the card 300, and the current slope limiter protects the VCC power terminal of the card 300 from current peaks. The voltage VCC-UICC-OUT then changes from low to high, for example, with a slight delay in relation to the voltage VCC-UICC-IN. The card 300 is then powered by the main power source. Also during this time, the NFC module disables the ability of the circuit 302 to automatically start upon detection of a radio frequency field. For example, upon being disabled, the linear voltage regulator does not adjust the value of the voltage VBAT to match the supply voltage value VCC-UICC-OUT expected by the card 300, the pull-down resistor does not protect the low-dropout regulator during its starting, and the first slew rate limiter does not protect the VCC supply terminal of the card 300 from current peaks, upon detection of a radio frequency field.

Between the instant t2 and an instant t3 subsequent to instant t2, the NFC module, having controlled the starting of the circuit 304, returns to the standby or inactive mode in which it was prior to the instant t1. The circuit 304 continues to operate. The voltages VCC-UICC-IN and VCC-UICC-OUT remain at a high state and power the card 300.

Between the instant t3 and an instant t4 subsequent to instant t3, the voltage VCC-UICC-IN changes from high to low, and is no longer able to power the card 300. According to one example, the device comprising the card 300 and the power supply circuit 301 is turned off, or the data transmission line providing the voltage VCC-UICC-IN is turned off. In the case considered here, i.e., when the NFC module was in an inactive state before being awakened by the change of state of the voltage VCC-UICC-IN, the voltage VCC-UICC-OUT then changes from the high state to the low state, for example, with a slight delay with respect to the voltage VCC-UICC-OUT. Indeed, according to one embodiment, the voltage detector 305 detects the change in state of the voltage VCC-UICC-IN (e.g., detects VCC-UICC-IN is equal to a reference voltage) and informs the NFC module, which then goes into an active state. Upon entering an active state the NFC module controls the shutdown of the circuit 304, and more specifically the voltage follower and slew rate limiter comprised in the circuit 304. For example, upon being shutdown, the voltage follower stops matching the impedance of the power source from which the voltage VCC-UICC-IN originates to the input impedance of the card 300, and the current slope limiter stops protecting the VCC power terminal of the card 300 from current peaks. The card 300 is then no longer powered by the main power source. Since the NFC module is in a standby or inactive state prior to the instant t3, the battery does not take over, to power the card 300. In addition, during this period, the NFC module re-enables the ability of the circuit 302 to automatically start upon detection of a radio frequency field. For example, upon being enabled, the linear voltage regulator adjusts the value of the voltage VBAT to match the supply voltage value VCC-UICC-OUT expected by the card 300, the pull-down resistor protects the low-dropout regulator during its starting, and the first slew rate limiter protects the VCC supply terminal of the card 300 from current peaks, upon detection of a radio frequency field.

However, if the NFC module had been in an active state prior to being awakened by the change in state of the voltage VCC-UICC-IN, then the power source for the voltage VCC-UICC-OUT would have been changed, to be the battery. To do this, the NFC module would have controlled the activation of circuit 302 and then the opening of switch 303.

Between the instant t4 and an instant t5 subsequent to the instant t4, the NFC module, having commanded the shutdown of circuit 304, returns to the standby or inactive mode in which it was before the instant t3. The voltages VCC-UICC-IN and VCC-UICC-OUT remain in a low state, and the card 300 is not powered.

At an instant t5 subsequent to the instant t4, the NFC module transitions from a standby or inactive state to an active state. According to one example, the NFC module has sensed a radio frequency field and is preparing to initiate near field communication.

Between an instant t6 subsequent to the instant t5, and an instant t7 subsequent to instant t6, the NFC module controls power to the card 300. Since the voltage VCC-UICC-IN is in a low state, power from the main power source of the device is not possible, and the battery is used to power the card 300. Thus, the NFC module controls the starting of the circuit 302 to provide the node SUPP-UICC-OUT with a voltage suitable to power the card 300. The voltage VCC-UICC-OUT then goes to a high state. The NFC module may transmit data to the card 300 if the near field communication it has initiated relates to the card 300, for example.

According to one example, starting the circuit 302 comprises using the pull-up resistor, as a first step, to ensure that the voltage VCC-UICC-OUT at the output node SUPP-UICC-OUT is at a low level. The pull-up resistor is used for a duration of about 400 μs, for example. The voltage regulator of circuit 302 is then started.

One advantage of the embodiment shown in connection with FIGS. 3 and 4, and by using the voltage detector 305, the NFC module can activate the circuit 304 and, more particularly, the slew rate limiter whenever the voltage state VCC-UICC-IN changes. This prevents current overages or current peaks that may be generated at these times.

Figure 5:
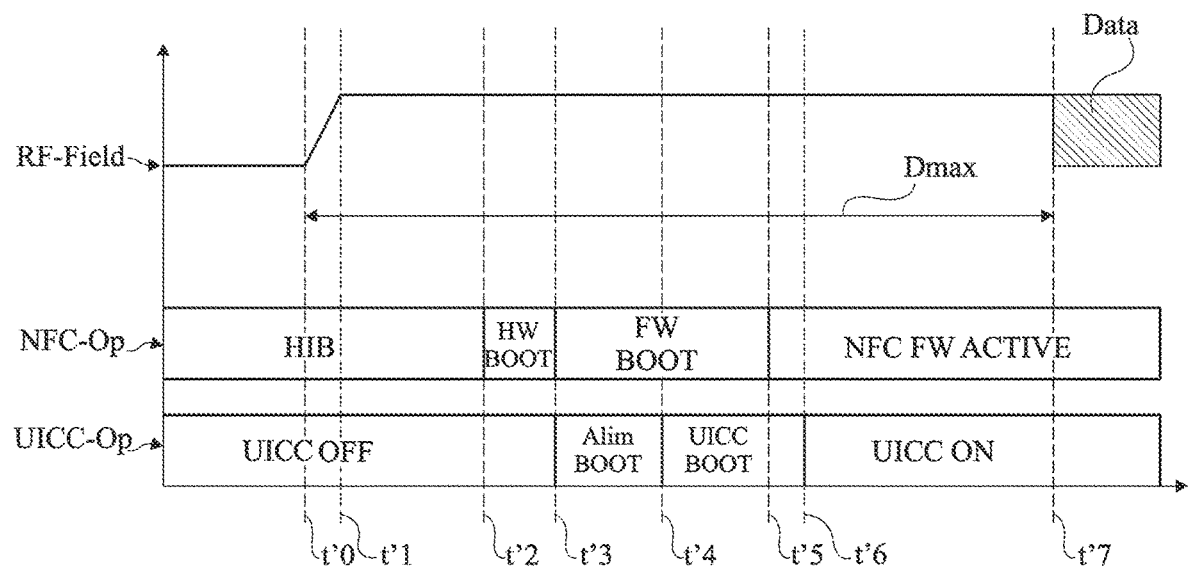
FIG. 5 shows timing diagrams illustrating a part of the operation of the embodiment of FIG. 1.

FIG. 5 shows a timing diagram and two diagrams illustrating in more detail operations performed during the starting of the NFC module 104 and the universal integrated circuit card(s) 105 of the device 100 described in connection with FIG. 1. In the example shown here, one card 105 of the device 100 is considered. Specifically, FIG. 5 illustrates:

an RF-Field timing diagram illustrating the occurrence of a radio frequency field;

an NFC-Op timing diagram illustrating the operations implemented for the starting of the NFC module; and a UICC-Op timing diagram illustrating the operations implemented for the starting of the circuit card 105.

The starting of the NFC module 104 corresponds to the transition from a standby or inactive state to the active state. The starting of the NFC module occurs when the NFC module detects a radio frequency field, for example. It should be noted that when the NFC module is in standby or inactive, it is capable of detecting a radio frequency field, and for this the NFC module periodically (in a variant, continuously) performs a radio frequency field search. According to one example embodiment, when the NFC module is in standby or inactive, it performs a radio frequency field search every 0.5 to 5 ms, for example every 1 to 2 ms. And by performing these searches periodically, the NFC module lowers its power consumption.

In addition, the starting of the circuit card 104 corresponds to the transition from an off state, where the circuit card 104 cannot be used, to an on state, where the circuit card 104 can use most of its functions.

Prior to an initial instant t'0, no radio frequency field is present or can be detected by the NFC module 104 and the RF-Field timing diagram is in a low state. The NFC module 104 is in a sleep or inactive state (HIB). The circuit card 105 is turned off (UICC OFF).

Between the initial instant t'0 and an instant t'1, subsequent to the instant t'0, a radio frequency field may be detected by the NFC module 104, and the RF-Field timer goes into a high state. Specifically, a radio frequency field is considered made detectable from the instant t'0. The field remains detectable without sending a command for a duration Dmax during which the surrounding devices are supposed to prepare themselves to be able to capture said field. According to one example embodiment, the duration Dmax is about 5 ms. Once the duration Dmax is over, the field starts to send instructions and the data "Data", shown by a hatched rectangle in FIG. 5. In the specific case of FIG. 5, this means that the NFC module 104 of the device is active before an instant noted t'0+Dmax. The NFC module 104 does not detect the automatic radio frequency field. The NFC module is therefore in standby or inactive. Similarly, the circuit card 105 is off.

At an instant t'2 subsequent to instant t'1, the NFC module 104 detects the radio frequency field. The NFC module 104 begins the various operations included in its starting to become active. To do this, the NFC module 104 initially controls the starting of certain circuits and components of the electronic device (HW BOOT). The circuit card 105 is switched off. Specifically during this start, the internal power supplies and power circuits of the electronic device are started.

Between the instant t'3 and an instant t'4 subsequent to the instant t'3, according to one embodiment, the NFC module 104 controls the starting of the various software or programs of the electronic device (FW BOOT) and the starting of the circuit card 105.

The starting of the various software programs of the electronic device 100 is implemented by the processor 101 of the device 100.

The starting of the card 105 begins with the starting of the power supply to the universal integrated circuit card of the electronic device (UICC Alim). Specifically, the NFC module checks the voltage delivered by the power supply circuit of the card 105. The automatic starting of the supply voltage regulator of the card causes the device 100 to start a counter, which is intended to be read later and its contents communicated to the NFC circuit software. This allows it to determine when the universal integrated circuit card (UICC) is powered by the voltage regulator. Based on this, the NFC router software is able to determine when it can initiate communication with the UICC. In practice, once the power supply circuit is capable of supplying power to the circuit card 105, i.e., at an instant t'4 subsequent to the instant t'3, the starting of the circuit card 105 (UICC BOOT) can begin, and more specifically the software starting of the card 105 can begin.

At an instant t'5 subsequent to the instant t'3 and, for example, subsequent to the instant t'4, the software of the device 100 is in a working state. The NFC module may then enter an active state (NFC FW ACTIVE) and prepare to receive instructions and data "Data" provided by the radio frequency field.

At an instant t'6 subsequent to the instant t'4 and, for example, subsequent to the instant t'5, the circuit card 105 is in a state to operate (UICC ON). For example, the UICC is ready to provide confidential data related to one or more functions of the electronic device 100 to other components of the device 100.

At an instant t'7 corresponding to the instant t'0+Dmax, the NFC module, the circuits and components of the device 100 controlled by the NFC module and the circuit card 105 are ready to receive instructions and commands "Data" from the radio frequency field.

One advantage of this embodiment is that due to the presence of the voltage detector 305 of the power supply circuit of the card 105 (described in connection with FIG. 3), the NFC module can start said power supply circuit without requiring the starting of the software of the device 100. In some cases, this allows the NFC module and the card 105 to be started up in less than the Dmax, i.e., less than 5 ms in one example embodiment. More generally, this embodiment allows for faster starting of the NFC module and the circuits and components that it controls.

In addition, this embodiment may be adapted to power the secure element 106 of the device 100. Indeed, as with the card(s) 105, the NFC module may be adapted to control the start of powering the secure element 106 each time the NFC module detects a radio frequency field. Thus, according to one embodiment similar to the operation implemented at the instant t'3, once the NFC module has started certain circuits and components of the device 100 (HW BOOT), the NFC module simultaneously controls:

starting the power circuitry of the secure element 106; and starting the various software programs of the device 100.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

An electronic device (100) may be summarized as including—at least one universal integrated circuit card (105; 300) or at least one secure element (105) and at least one power supply circuit (103; 301) for said card or secure element, said power supply circuit (103; 301) being connected to at least a first power supply voltage source of the electronic device (100) and comprising a voltage detector (305) adapted to determine if said first voltage source provides a first power supply voltage (VCC-UICC-IN) different from a reference voltage; and at least one near field communication module (104) adapted to enter an active mode whenever said voltage detector (305) determines that said first supply voltage (VCC-UICC-IN) is different from the reference voltage.

A method for powering an universal integrated circuit card (105; 300) or a secure element comprised in an electronic device (100), may be further summarized as including—at least one power supply circuit (103; 301) for said card or secure element, said power supply circuit (103; 301) being connected to at least a first power supply voltage source of the electronic device (100) and comprising a voltage detector (305) adapted to determine whether said first voltage source provides a first power supply voltage (VCC-UICC-IN) different from a reference voltage; and at least one near field communication module (104) adapted to enter an active mode whenever said voltage detector (305) determines that said first supply voltage (VCC-UICC-IN) is different from the reference voltage.

The first supply voltage of said first voltage source, in the power supply circuit (301) of said card (105, 300) or said secure element, may be supplied to said card (300) or said secure element through a switch (303) controlled by a first circuit (304) comprising a voltage follower and a first slew rate limiter.

Whenever said voltage detector (305) determines that said first supply voltage (VCC-UICC-IN) is different from the reference voltage, said near field communication module (104) may control the startup of said first circuit (304).

Whenever said voltage detector (305) determines that said first supply voltage (VCC-UICC-IN) is equal to the reference voltage, said near field communication module (104) may control the shutdown of said first circuit (304).

The power supply circuit (103; 301) may be connected to at least one second power supply voltage source of the electronic device (100).

The at least one second supply voltage source may be a battery.

A second supply voltage (VBAT) of said second voltage source in the power supply circuit (301), of said card (105; 300) or said secure element, may be supplied to said card (105; 300) or said secure element through a second circuit (302) comprising a linear voltage regulator and a second slew rate limiter.

Whenever the voltage detector (305) determines that said first supply voltage (VCC-UICC-IN) is different from the reference voltage, said near field communication module (104) may disable the automatic startup [of shutdown] of said second circuit (302).

Whenever the voltage detector (305) determines that said first supply voltage (VCC-UICC-IN) is equal to the reference voltage, said near field communication module (104) may enable the automatic startup of said second circuit (302).

When the near-field communication module goes from a standby state or an inactive state to an active state, the following successive operations may be performed: —the components and circuits of said electronic device (100) are started;

the software of the electronic device (100) and said card (105; 300) are started at the same moment.

Startup of said card or said secure element may include the following successive steps: —starting the power supply circuit (301) of said card (105; 300) or said secure element; and starting the software of said card (105; 300) or said secure element.

During the startup of the power circuit, said voltage detector may check whether the first voltage source provides a first supply voltage equal to the reference voltage.

The power circuit (301) may supply said secure card or element with said second power source.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device comprising:
at least one universal integrated circuit card (UICC) or at least one secure element;
at least one power supply circuit for the UICC or secure element, the power supply circuit being electrically connected to a first power supply voltage source of the electronic device, the power supply circuit including a voltage detector configured to determine whether or not the first power supply voltage source provides a first power supply voltage different from a reference voltage; and
at least one near field communication module configured to enter an active mode in response to the first power supply voltage being determined by the voltage detector to be different from the reference voltage, wherein the power supply circuit includes a first circuit including a voltage follower, a slew rate limiter, and a switch controlled by the first circuit.

2. The device according to claim 1, wherein:
the first power supply voltage of the first power supply voltage source is supplied to the UICC or the secure element through the switch.

3. The device according to claim 2, wherein, in response to the first power supply voltage being determined by the voltage detector to be different from the reference voltage, the near field communication module controls a startup of the first circuit.

4. The device according to claim 2 wherein, in response to the first power supply voltage being determined by the voltage detector to be equal to the reference voltage, the near field communication module controls a shutdown of the first circuit.

5. The device according claim 1, wherein the power supply circuit is electrically connected to a second power supply voltage source of the electronic device.

6. The device according to claim 5, wherein the second power supply voltage source is a battery.

7. The device according to claim 5, wherein a second power supply voltage of the second power supply voltage source is supplied to the UICC or the secure element through a second circuit including a linear voltage regulator and a slew rate limiter.

8. The device according to claim 7, wherein, in response to the first power supply voltage being determined by the voltage detector to be different from the reference voltage, the near field communication module disables a startup of the second circuit.

9. The device according to claim 7, wherein, in response to the first power supply voltage being determined by the voltage detector to be equal to the reference voltage, the near field communication module enables a startup of the second circuit.

10. A method comprising:
determining, by a voltage detector of an electronic device, whether or not a first power supply voltage source provides a first power supply voltage different from a reference voltage, the electronic device including:
at least one universal integrated circuit card (UICC) or at least one secure element;
at least one power supply circuit for the UICC or secure element, the power supply circuit being electrically connected to the first power supply voltage source, the power supply circuit including the voltage detector, wherein the power supply circuit includes a first circuit including a voltage follower, a slew rate limiter, and a switch controlled by the first circuit; and
at least one near field communication module; and
entering, by the near field communication module, an active mode in response to the voltage detector determining the first power supply voltage is different from the reference voltage.

11. The method according to claim 10, wherein:
the UICC or the secure element is configured to receive the first power supply voltage of the first power supply voltage source through the switch.

12. The method according to claim 11, further comprising:
in response to the voltage detector determining the first power supply voltage is different from the reference voltage, controlling, by the near field communication module, a startup of the first circuit.

13. The method according to claim 11, further comprising:
in response to the voltage detector determining the first power supply voltage is equal to the reference voltage, controlling, by the near field communication module, a shutdown of the first circuit.

14. The method according to claim 10, wherein
the power supply circuit is electrically connected to a second power supply voltage source of the electronic device, and
the UICC or the secure element is configured to receive a second power supply voltage of the second power supply voltage source through a second circuit including a linear voltage regulator and a slew rate limiter.

15. The method according to claim 14, further comprising:
in response to the voltage detector determining the first power supply voltage is different from the reference voltage, disabling, by the near field communication module, a startup of the second circuit.

16. The method according to claim 14, further comprising:
in response to the voltage detector determining the first power supply voltage is equal to the reference voltage, enabling, by the near field communication module, a startup of the second circuit.

17. A method comprising:
determining, by a voltage detector of a power supply circuit for a universal integrated circuit card (UICC) or a secure element, whether or not a first power supply voltage source provides a first power supply voltage different from a reference voltage, wherein the power supply circuit includes a first circuit including a voltage follower, a slew rate limiter, and a switch controlled by the first circuit; and
switching, by a near field communication module, from a standby state or an inactive state to an active state in response to the voltage detector determining the first power supply voltage is different from the reference voltage, the switching including:
starting components and circuits of an electronic device that includes the power supply circuit, the UICC or the secure element, and the near field communication module; and
concurrently starting (1) software of the electronic device and (2) the UICC or the secure element.

18. The method according to claim 17, wherein the starting of the UICC or the secure element includes:
starting the power supply circuit; and
starting, subsequent to the starting of the power supply circuit, software of the UICC or the secure element.

19. The method according to claim 18, wherein the starting of the power supply circuit includes checking, by the voltage detector, whether the first power supply voltage source provides a first supply voltage equal to the reference voltage.

20. The method according to claim 18, further comprising:
supplying, by the power supply circuit, the UICC or the secure element with a second power source.

* * * * *